United States Patent [19]

Smith et al.

[11] Patent Number: 5,229,444
[45] Date of Patent: Jul. 20, 1993

[54] ANTIOXIDANT POLYOLEFIN COMPOSITIONS

[75] Inventors: William L. Smith, Basking Ridge, N.J.; Michel Fouré', Maisons Laffitte, France; Dominique Ranceze, Lescar, France; Pierre Tozzolino, Serres-Morlaas, France

[73] Assignee: Elf Atochem North America, Inc., Pa.

[21] Appl. No.: 745,579

[22] Filed: Aug. 15, 1991

[51] Int. Cl.$^5$ .............................. C08K 5/58
[52] U.S. Cl. ......................... 524/182; 524/180
[58] Field of Search ............. 524/180, 181, 182

[56] References Cited

U.S. PATENT DOCUMENTS

| | | | |
|---|---|---|---|
| 2,985,617 | 5/1961 | Salyer et al. | 524/399 |
| 3,015,644 | 1/1962 | Leistner et al. | 524/180 |
| 3,154,529 | 10/1964 | Kobayashi et al. | 524/583 |
| 3,442,852 | 5/1969 | Dorfelt et al. | 524/182 |
| 3,576,785 | 4/1971 | Weisfeld | 524/181 |
| 4,113,678 | 9/1978 | Minagawa et al. | 260/23.7 M |
| 4,181,671 | 1/1980 | Burley et al. | 260/410.6 |
| 4,254,017 | 3/1981 | Dworkin et al. | 524/180 |
| 4,508,863 | 4/1985 | Kauder et al. | 524/181 |

FOREIGN PATENT DOCUMENTS 43-13376 6/1988 Japan ................ 25 H/311.1 X
851138 10/1960 United Kingdom .

OTHER PUBLICATIONS

Stapler et al: ACS-Div. Polymer Chem., Polymer Preprints Mar. 1971, vol. 12, No. 1, pp. 795-803.

*Primary Examiner*—Veronica P. Hoke
*Attorney, Agent, or Firm*—Stanley A. Marcus

[57] ABSTRACT

Antioxidant-containing polyolefin composition containing a polyolefin and an antioxidant compound having the general formula:

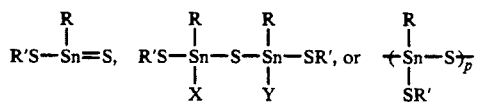

wherein R, R', X and Y are the same or different and are selected from alkyl, phenyl, cyclohexyl, a mono or polyfunctional carboxylic acid ester, hydroxyalkyl, and aralkyl, which groups may be unsubstituted or substituted, linear or branched, or cyclic, and p indicates a degree of polymerization and is at least 2.

22 Claims, 2 Drawing Sheets

ANTIOXIDANT POLYOLEFIN COMPOSITIONS

BACKGROUND OF INVENTION

1. Field of the Invention

This invention relates to polyolefin compositions, and, more particularly, to antioxidant-containing polyolefin compositions which are particularly effective in providing antioxidant stabilization at relatively low concentration levels.

2. Description of the Prior Art

Polyolefins, such as polyethylene, polypropylene and the like, are known to be susceptible to degradation in air. The effect of oxygen upon the polyolefin causes oxidation of carbon-hydrogen bonds in the molecule, resulting in embrittlement, and, color deterioration or yellowing of the polymer. In addition, the polymer can experience a loss of molecular weight upon cleavage in the presence of oxygen, which effect is measured as a change in the melt flow index of the polymer.

Both these oxidative reactions can be slowed down by including an antioxidant material in the polymer composition. Suitable antioxidants for polyolefins are hindered phenols, that is, phenols which are substituted with large alkyl groups in the ortho positions of the phenol. The hindered phenols preferably are used in combination with other antioxidants, including thioesters, e.g. thiodipropionic acid esters; organic phosphites; and hindered amines (HALS). However, such secondary antioxidants require a rather high concentration level to be effective.

Accordingly, it is an object of the present invention to provide new and effective antioxidant-containing polyolefin compositions which will advantageously prevent the polyolefins from undergoing a significant color change in air or of suffering a loss in molecular weight during processing.

Another object of the invention is to provide such compositions in which the antioxidant is effective at relatively low concentration levels.

These and other objects and features of the invention will be made apparent from the following description of the invention.

SUMMARY OF THE INVENTION

The antioxidant-containing polyolefin compositions of the invention are characterized particularly by including an antioxidant of the general formulas:

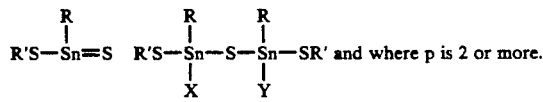

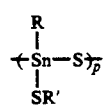

Suitably, R and R' X and Y are the same or different and are selected from alkyl, phenyl, cyclohexyl, a mono or polyfunctional carboxylic acid ester, hydroxyalkyl, and aralkyl, etc., which groups may be unsubstituted or substituted, linear or branched, or cyclic.

It will be understood that these formulas are merely representative of reaction products obtained from precursor materials.

The polyolefin antioxidant compositions of the invention are particularly characterized by a high induction period of stabilization of the polyolefin in air, and a low melt flow index, after extrusion.

DETAILED DESCRIPTION OF THE INVENTION

Figure 1:
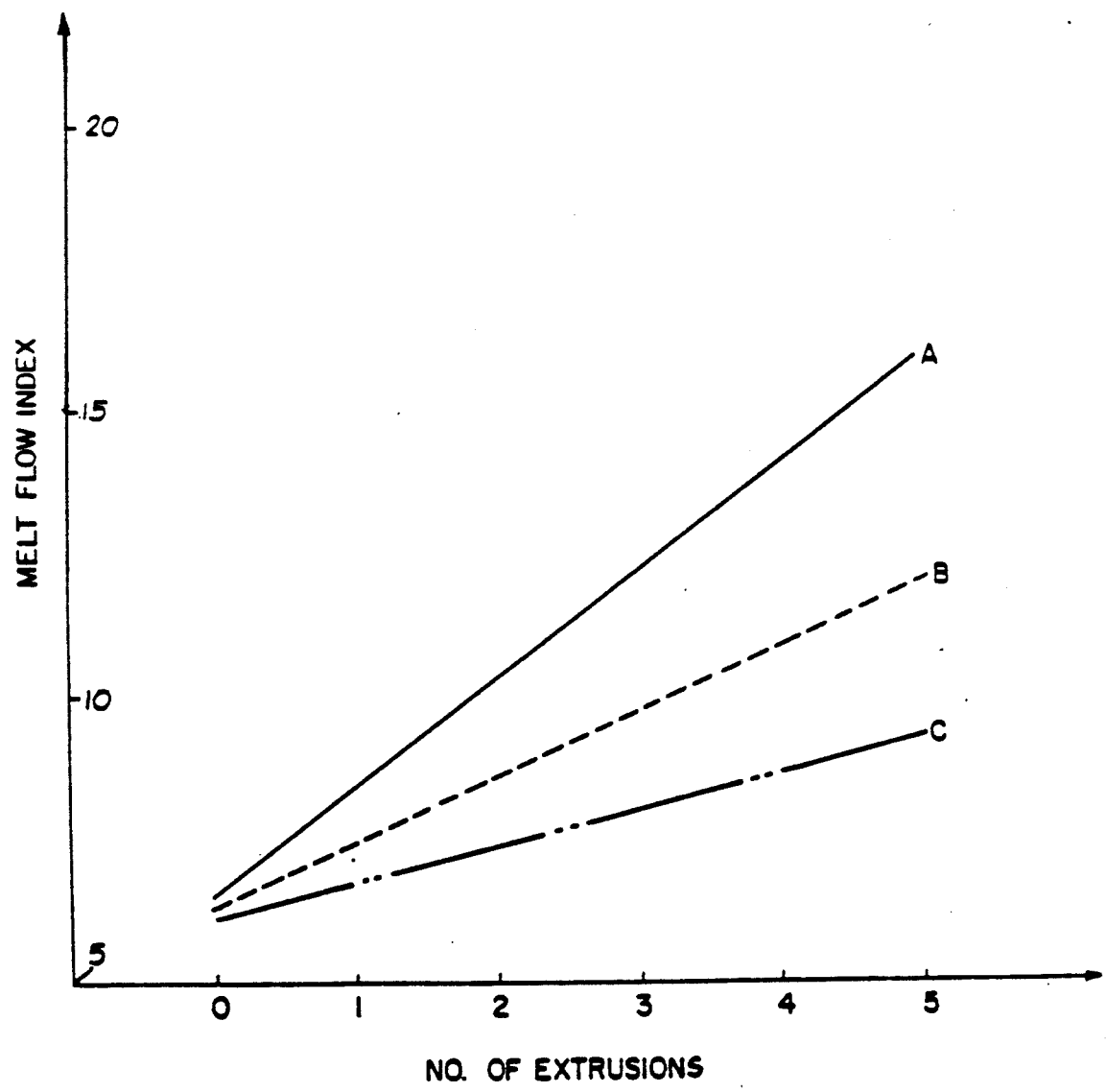
FIGS. 1 and 2 are plots of the melt flow index of the polyolefin compositions versus the number of extrusions.

Typical antioxidant compounds for use in the composition of the invention are described in various U.S. Patents the following:

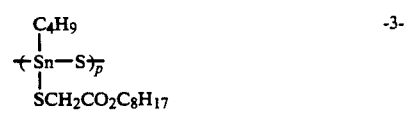

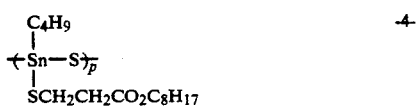

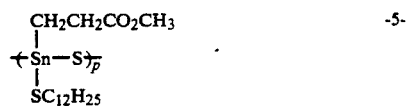

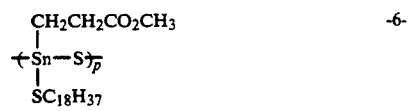

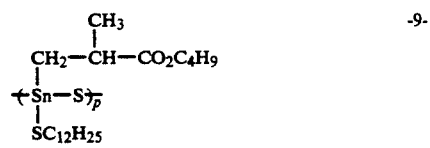

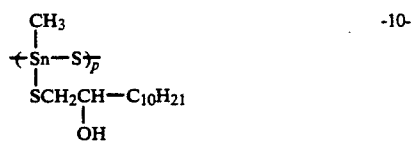

-continued

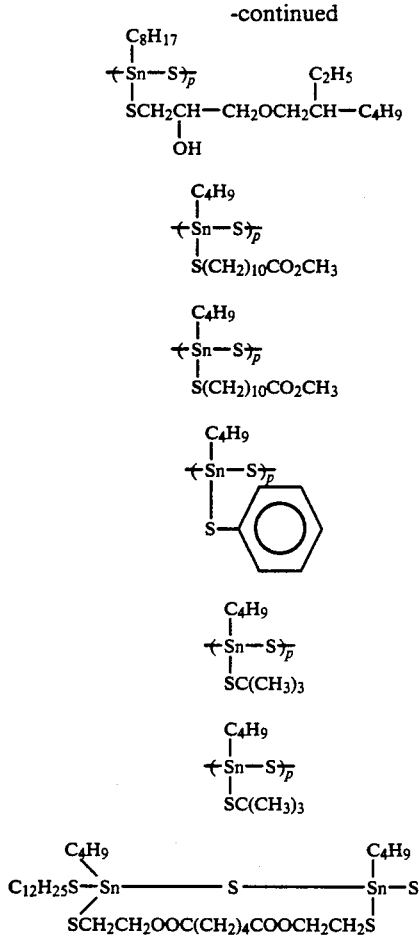

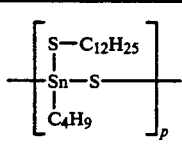

The antioxidant compounds according to the invention are incorporated in the polyolefin resin at a level of from 0.005% to 5% by weight of the resin. The concentration preferably used in from 0.005% to 2% and, most preferably, from 0.01% to 0.5%.

The composition also may include other antioxidants, too, for example, hindered phenols, thioesters, phosphites, HALS, etc.: and, other additives known in the art, such as mineral fillers, lubricants, UV absorbers, metal deactivators, flame retardants, antistats, pigments, etc.

The invention is illustrated by the non-limiting examples which follow.

EXAMPLE 1

Preparation of

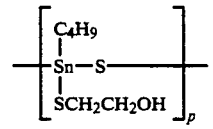

| Material | Amounts | Chemical Name |
|---|---|---|
| BuSnCl$_3$ | 148.5 | monobutyltin trichloride |
| n-C$_{12}$H$_{25}$SH | 60.7 | n-dodecyl mercaptan |
| NH$_4$OH | 17.4 | conc. ammonium hydroxide |
| Na$_2$Sx H$_2$O(60%) | 8.4 | hydrated sodium sulfide |
| H$_2$O | 100 | |
| Toluene | 217 | |

1. charge BuSnCl$_3$, n-C$_{12}$H$_{25}$SH, toluene, and H$_2$O to the pot.

-continued 2. add NH$_4$OH dropwise to the pot with stirring.
3. heat to 70° C., stir ½ hour.
4. cool to <50° C., then slowly add Na$_2$S.
5. heat to 65–70° C. and stir ½ hour.
6. stop stirring, allow phases to split, removed aqueous phase.
7. vacuum strip the organic layer to 120° C. max.
8. cool, then filter to give a clear yellow liquid; yield about 111 grams.

EXAMPLE 2

Preparation of $$\left[ \begin{array}{c} C_4H_9 \\ | \\ -Sn-S- \\ | \\ SCH_2CH_2OH \end{array} \right]_p$$

| Material | Amount | Chemical Name |
|---|---|---|
| BuSnCl$_3$ | 92.8 | |
| HOCH$_2$CH$_2$SH | 26.4 | 2-mercaptoethanol |
| Na$_2$S (60%) | 42.2 | |
| NaOH | 26.4 | concentrated solution |
| H$_2$O | 109 | |
| toluene | 85 | |

1. mixed BuSnCl$_3$, H$_2$O, HOCH$_2$CH$_2$SH, and toluene in a flask.
2. added NaOH solution dropwise with rapid stirring.
3. heated to 60° C., and stirring for ½ hour.
4. cooled pot temperature to 40° C., added Na$_2$S.
5. heated to 60°, and stirred for ½ hour.
6. stopped stirring, allowed phases to split, and removed aqueous phase.
7. vacuum stripped to 110° C., max.
8. cooled to give a light yellow, viscous product.

EXAMPLE 3

A homogenous mixture is made from the antioxidant compound to be tested and polypropylene resin in powder form. The mixture is kneaded for 5 minutes at 180° C. in a roll mill. The effectiveness of a given antioxidant is determined by subjecting a test composition to an oxygen atmosphere at 200° C. The onset of resin degradation is determined with a differential thermal analyzer. The time necessary to observe degradation is referred to as the "induction time" of the antioxidant.

The antioxidant compounds according to the invention may be compared with commercial antioxidants, e.g., an hindered phenol, such as:

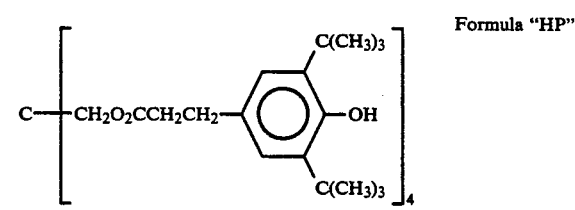

Formula "HP"

which can be used alone or in combination with distearyl thiodipropionate (DSTDP):

S(CH$_2$CH$_2$CO$_2$C$_{18}$H$_{37}$)$_2$

TABLE I

| Antioxidant Compounds | Concentration (ppm) | Induction Time (minutes) |
|---|---|---|
| none | — | 1 |
| "HP" | 1000 | 8 |
| "HP" | 1000 | 12 |
| DSTDP | 2000 | |
| 1 | 2000 | >50 |
| 2 | 2000 | >50 |
| 3 | 1000 | 37 |
| 4 | 1000 | >50 |
| 4 | 500 | >50 |
| 5 | 1000 | >50 |
| 6 | 1000 | 48 |
| 17 | 2000 | >50 |

These examples clearly show that the tin derivatives according to the invention, even when they are used alone, the tin derivatives according to the invention effectively delay the degradation of the resin in the conditions of the test. Even at low concentrations the compounds of the invention are more efficient than the hindered phenols known in the prior art, even when they are combined with thioester (DSTDP).

EXAMPLE 4

In the following examples, the test mixtures are extruded with a single screw Buss extruder at 230° C., and then extruded five times consecutively with a twin screw extruder at 270° C. After each pass, a sample of the stabilized resin is taken in order to determine the melt flow index (MFI) at 230° C. A higher value of MFI indicates that the propylene is more degraded.

TABLE 2

| Stabilizer | Common base: - Polypropylene Calcium stearate 500 ppm | | |
|---|---|---|---|
| | Concentration (ppm) | | |
| | A | B | C |
| "HP" | 500 | — | — |
| PS (1) | 500 | — | — |
| 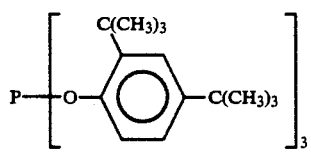 | | 200 ppm | 500 ppm |

The results are shown in FIG. 1. The formulations containing the tin derivative according to the invention are much more stable than those containing the hindered phenol and phosphite.

(1) Phosphite solid $$\left[ P-O-\underset{C(CH_3)_3}{\underset{|}{\overset{C(CH_3)_3}{\overset{|}{\bigcirc}}}}-C(CH_3)_3 \right]_3$$

EXAMPLE 5

The same common base and operating conditions as in the examples of Table 2 are used, using the compound of Example 2.

TABLE 3

| Stabilizer | Concentration (ppm) | |
|---|---|---|
| | A | D |
| "HP" | 500 | — |
| PS | 500 | — |
| | | 300 |

Figure 2:
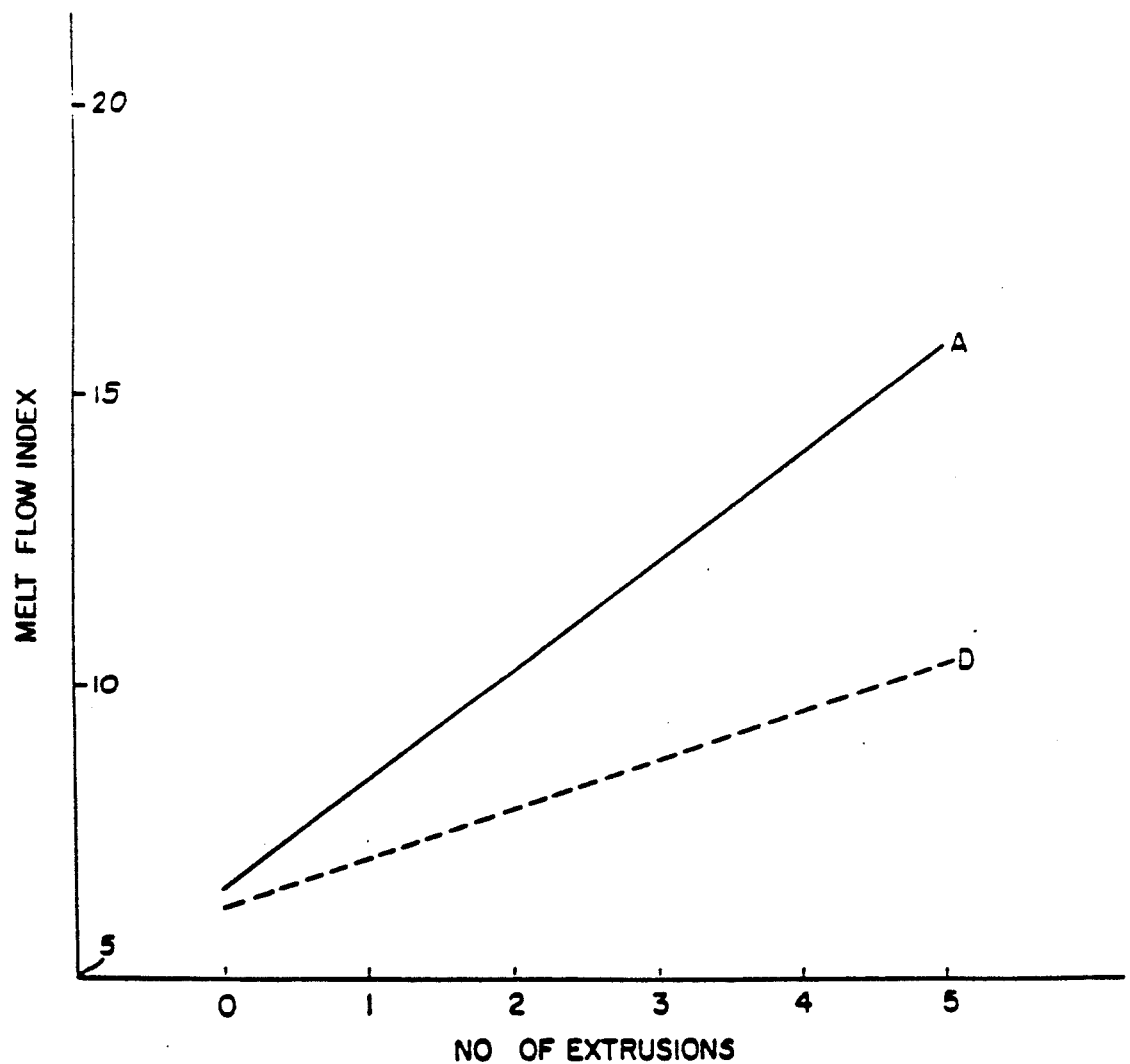

The results as shown in FIG. 2 where it is seem that the tin derivative according to the invention imparts a far better protection to the resin than the hindered phenol and phosphite system.

While polyolefins are shown herein, it will be understood that blends of polyolefins with non-polyolefins may be used as well.

As stated, the formulas herein are merely representations of reaction products obtained from precursor materials. In general, these products are made by reacting a mono or diorganotin tri or dihalide or mixtures thereof, with an organic mercaptan in the presence of base, and then reacting the mixture with an inorganic sulfide. A representative organotin is monobutyltin chloride; representative mercaptans include mercapto esters, alcohols, aryl and alkyl mercaptans and bis(mercaptoalkyl esters).

What is claimed is:

1. An antioxidant-containing polyolefin composition comprising a polyolefin and an antioxidant compound having general formula:

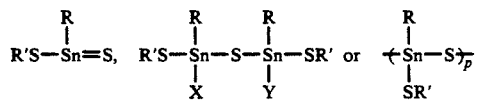

wherein R,R', X and Y are the same or different and are selected from alkyl, phenyl cyclohexyl, a mono or polyfunctional carboxylic acid ester, hydroxyalkyl, and aralkyl, which groups may be unsubstituted or substituted, linear or branched, or cyclic, and p indicates a degree of polymerization and is at least 2.

2. An antioxidant-containing polyolefin composition according to claim 1 wherein said antioxidant compound is:

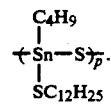

3. An antioxidant-containing polyolefin composition according to claim 1 wherein said antioxidant compound is:

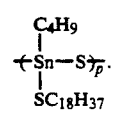

4. An antioxidant-containing polyolefin composition according to claim 1 wherein said antioxidant compound is:

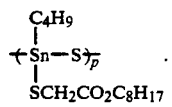

5. An antioxidant-containing polyolefin composition according to claim 1 wherein said antioxidant compound is:

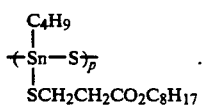

6. An antioxidant-containing polyolefin composition according to claim 1 wherein said antioxidant compound is:

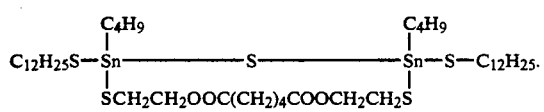

7. An antioxidant-containing polyolefin composition according to claim 1 wherein said antioxidant compound is:

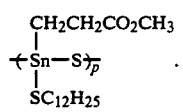

8. An antioxidant-containing polyolefin composition according to claim 1 wherein said antioxidant compound is:

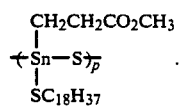

9. An antioxidant-containing polyolefin composition according to claim 1 wherein said antioxidant compound is:

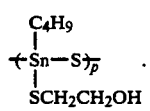

10. An antioxidant-containing polyolefin composition according to claim 1 wherein said antioxidant compound is:

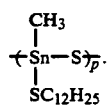

11. An antioxidant-containing polyolefin composition according to claim 1 wherein said antioxidant compound is:

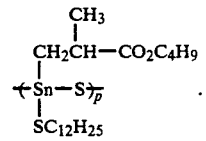

12. An antioxidant-containing polyolefin composition according to claim 1 wherein said antioxidant compound is:

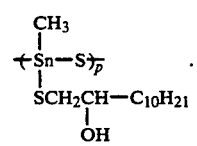

13. An antioxidant-containing polyolefin composition according to claim 1 wherein said antioxidant compound is:

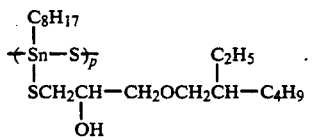

14. An antioxidant-containing polyolefin composition according to claim 1 wherein said antioxidant compound is:

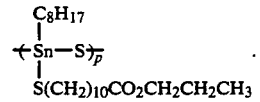

15. An antioxidant-containing polyolefin composition according to claim 1 wherein said antioxidant compound is:

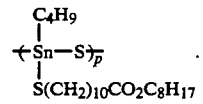

16. An antioxidant-containing polyolefin composition according to claim 1 wherein said antioxidant compound is:

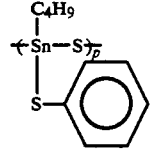

17. An antioxidant-containing polyolefin composition according to claim 1 wherein said antioxidant compound is:

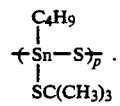

18. An antioxidant-containing polyolefin composition according to claim 1 wherein said antioxidant is present at a concentration of 0.005 to 5% by weight of the resin.

19. An antioxidant-containing polyolefin composition according to claim 18 wherein said concentration is about 0.01 to 0.5%.

20. A composition according to claim 18 which includes copolymers which are blends of polyolefins with non-polyolefins.

21. A composition according to claim 18 which includes copolymers of ethylene and propylene.

22. A composition according to claim 1 wherein said compound is a reaction product made by reacting a mono or diorganotin tri or dihalide, or mixtures thereof, with an organic mercaptan, in the presence of base, and then reacting the mixture obtained with an inorganic sulfide.

* * * * *